Aug. 8, 1950

K. LOGAN 2,517,899

CRAB CRACKER

Filed April 23, 1947

INVENTOR
KENNETH LOGAN

BY Eugene D. Farley

ATTORNEY

Patented Aug. 8, 1950

2,517,899

UNITED STATES PATENT OFFICE 2,517,899

CRAB CRACKER

Kenneth Logan, Warrenton, Oreg.

Application April 23, 1947, Serial No. 743,254

10 Claims. (Cl. 17—10)

This invention relates to apparatus for cracking the shells of crabs and other crustacea to extract the meat therefrom.

The extraction of meat from the shells of crustacea, particularly crabs, presents a problem in that although the body portion may be opened comparatively easily, the legs and claws are protected by heavy shells which are difficult to crack. Unless the force of the blow by which the shell is fractured is estimated very exactly, it may fail to crack the shell, if too light or, if too heavy, may crush the meat so that it may be extracted only in fragments. This is undesirable since whole sections or pieces of crab meat are in the greatest demand and command the highest price.

It is the present practice in commercial crab canneries to station a group of operators at a work bench or table and to provide each with a quantity of crabs and a mallet. Each operator then opens the bodies of the crabs, breaks off the legs and claws, cranks them open to expose the meat and separates the meat from the shells. This entails picking up the mallet, striking the legs and claws to crack the shell, laying down the mallet, and picking out the meat. The repeated manipulations of the mallet which are necessary to carry out this sequence of operations are both time- and energy-consuming and reduce the efficiency of the process. In addition, it is difficult for the operator to gauge the force required to crack the shell and to control the mallet so as not to crush the meat and thus reduce its merchantable value.

It is, therefore, the general object of the invention to provide apparatus which will simplify the procedure heretofore employed in extracting the meat from the crab legs by eliminating the manipulations of a mallet.

It is a further object to provide apparatus for cracking crab legs which may be controlled positively to avoid or minimize damage to the crab meat.

A further object is to provide a crab cracker which will comprise a minimum of working parts and which will be simple to operate.

A further object is the provision of a crab cracker which is flexible and which may be used to crack selectively indicated sections of the shell.

Still a further object is the provision of a crab cracker which is adapted to operation by mechanical means.

The manner in which the foregoing and other objects are accomplished will be apparent from the following specification and claims considered together with the accompanying drawing wherein:

The herein described apparatus for cracking the shells of crabs in order to obtain the meat therefrom essentially comprises an anvil on which the various parts of the crab may be placed for cracking, a hammer positioned opposite the anvil and adapted to cooperate therewith in the cracking operation, means for pivotally supporting the hammer so that it may be oscillated with respect to the anvil, and means for holding the hammer normally apart from the anvil and for returning it to this position after it has been actuated toward or against the anvil.

Figure 1:
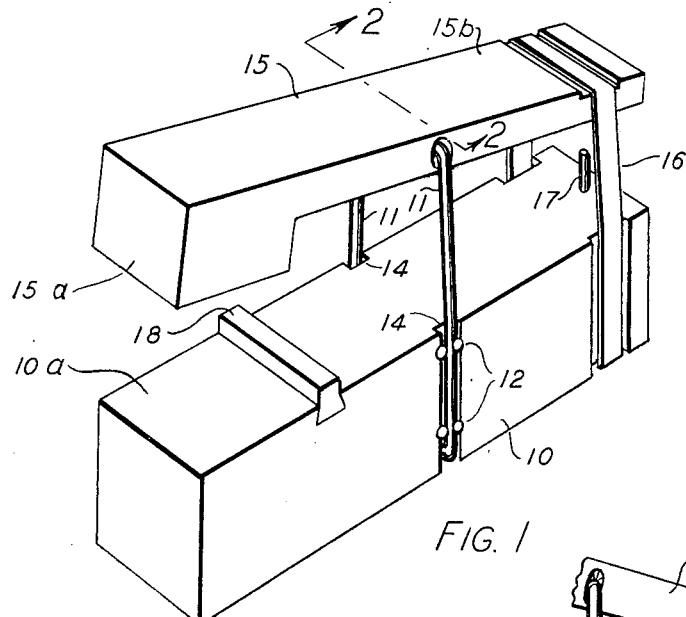
Figure 1 is a perspective view of the crab cracker of the invention in one of its embodiments.
Figure 2:
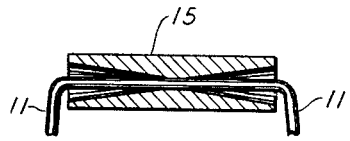
Figure 2 is a fragmentary sectional view taken along the line 2—2 of Figure 1.

Thus, in the modification illustrated in Figures 1 and 2 the crab cracker of the invention comprises a base member 10 which preferably is made from wood or plastic and has at one end an anvil portion 10a of relatively generous proportions in order to accommodate several crab legs at one time. Attached to the base at some intermediate point is the support member or standard 11. This extends upwardly and may in a preferred form comprise heavy wire of corrosion resistant material, as stainless steel. It may be attached to the base by a plurality of nails 12, 12, staples or other suitable means and, to give it greater stability, preferably lies within the recesses 14, 14.

Pivotally attached to the support 11, is an elongated member or hammer 15 comprising a head portion 15a and a shank portion 15b, so disposed that the head lies opposite the anvil portion 10a of the base. Although pivotal attachment of the hammer to the support member may be had by any suitable means, a preferred means comprises providing through the shank portion 15b a perforation which is adapted to be penetrated by a segment of the support member 11. The latter thus serves as a fulcrum or pivot point about which the hammer may swing. It also serves a stabilizing function and prevents the hammer arm from side-slipping and losing its position relative to the base member.

The hammer preferably is attached to the support member in such a manner that it may be pivoted to a limited extent laterally as well as longitudinally. Hence, in addition to being capable of oscillation toward and away from the anvil in order to crack the crab legs, the hammer may be rocked back and forth so that one side or the other first approaches the anvil. This imparts to the device flexibility and the ability to strike preferentially certain segments of the crab legs placed on the anvil, a feature which is particularly advantageous when a leg which has partially been cracked open by one blow of the hammer is struck again to crack open the remaining portion. In such a case, the second blow may be directed toward the uncracked portion of the shell which will be cracked without crushing the meat within that portion of the shell which already has been cracked.

A preferred means for supporting the hammer so that it may be pivoted both longitudinally and laterally is illustrated in Figure 2, wherein the perforation through the shank of the hammer is in the form of a pair of aligned inwardly tapering recesses. This provides in the interior of the perforation a fulcrum upon which the hammer rests and about which it may be pivoted either longitudinally or laterally.

The face of the hammer portion 15a roughly corresponds to that of the anvil portion 10a, although it preferably is of somewhat smaller proportions. It is disposed at an angle such that as the hammer is struck, the forward portion approaches the anvil most closely, thus leaving a wedge-shaped space between the anvil and the face of the hammer. This is advantageous since when several legs of varying dimension are processed at one time, they may be held in such a manner that the small legs are toward the front and the large legs are toward the rear of the anvil. Each leg will then be struck with a blow which is proportional to its size and all will be cracked, but none will be crushed.

Means are provided to hold open the jaw of the cracker when at rest and to return it to the open position after the hammer has been struck. In the form illustrated in Figure 1, such means are resilient and comprise an elastic band 16 which is looped about the base member and about the shank of the hammer. As will be apparent to one skilled in the art, however, other types of resilient means may be employed for this purpose, e. g. suitably positioned extension springs, compression springs, leaf springs and the like. There also may be employed non-resilient means such as a counter-weight attached to or formed integrally with the shank of the hammer and adapted to hold the head of the hammer normally apart from the anvil. Such alternate means are discussed more fully hereinbelow in connection with Figures 3 and 4.

Means are also provided for holding the hammer when at rest in spaced relationship to the anvil. Thus, the stop 17 is located between the base member and the shank of the hammer at or toward the rear extremity of each. The stop is of sufficient height so that by preventing close approach of the shank of the hammer toward the rear of the base member it keeps open the jaw of the cracker a predetermined and optimum distance adapted to receive the crab legs to be cracked without requiring the operator to lift his hand more than is necessary to strike the head of the hammer. The effort required to operate the apparatus thus is kept as a minimum.

Although the stop 17 is indicated as a separate member, it will be apparent that it may be formed otherwise, as integrally with either base or hammer.

Means also may be provided to prevent crushing the meat during the cracking operation. Such means may comprise concavities disposed transversely across either the anvil or the face of the hammer and adapted to receive the legs to be cracked. In the form illustrated, however, these means comprise the stop block 18 which is positioned transversely of the base member and defines one boundary of the anvil. As thus positioned, it will be contacted by the rear portion of the face of the hammer, which will be prevented from descending entirely into contact with the anvil. As a result, a space will be left between the hammer and anvil which will accommodate the crab meat and prevent it from being crushed.

The stop block 18 is of a variable height, as required by the size of the crab legs being processed. It preferably is made of a resilient material such as rubber, which may be compressed to avoid shock and to insure cracking of crab legs which are of unusually small cross section. Although it preferably is positioned as indicated at the rear boundary of the anvil, thereby leaving the mouth of the cracker free from obstructions and permitting easy access of the materials operated upon, it will be apparent that it may be positioned otherwise and may assume different forms if desirable or necessary in a given case. Thus, it may be positioned forwardly on the anvil or in any desired position on the hammer. Furthermore, rather than comprising a continuous block, it may be discontinuous or may comprise a plurality of independent projections extending outwardly from the surface of the hammer or anvil or both.

Figure 3:
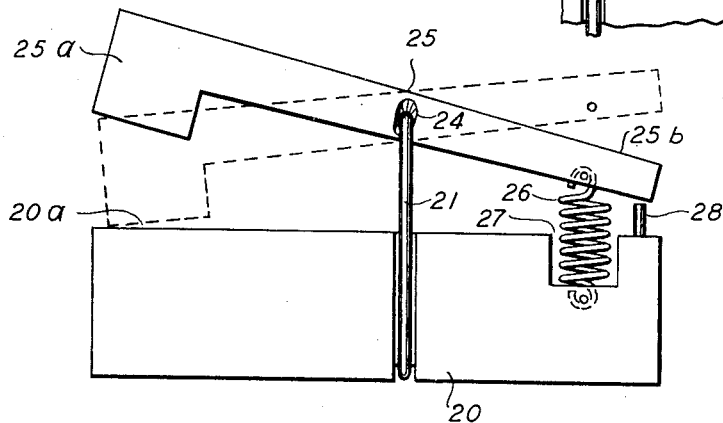
Figure 3 is a side elevation of the crab cracker of the invention in another of its embodiments.

An alternate modification of the invention wherein the elastic band of Figure 1 is replaced by a coil spring and the resilient stop block is omitted altogether is illustrated in Figure 3. In this embodiment there is provided a recessed base member 20 having an anvil portion 20a. Extending upwardly from the base member is the support member or standard 21. This is of the same general design and appearance as that illustrated in Figures 1 and 2. It is attached to the base by any suitable means and penetrates a perforation 24 in the hammer 25. The hammer is comprised of a head portion 25a, which is disposed oppositely to the anvil, and a shank portion 25b. Hammer and base are interconnected by means of the extension spring 26 which lies in part within the recess 27 in the base. The stop 28, like the stop 17 of Figure 1 serves the purpose of holding the head of the hammer a spaced distance from the anvil.

Figure 4:
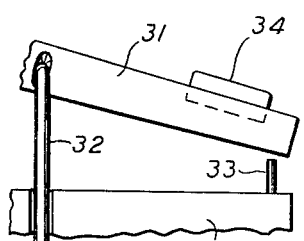
Figure 4 is a fragmentary view in perspective illustrating the crab cracker of the invention in still another of its embodiments.

Still another modification of the invention is illustrated in Figure 4. In this embodiment, the resilient means for holding open the jaw of the cracker, i. e., the elastic band of Figure 1 or the spring of Figure 3, is replaced by a counterweight on the shank of the hammer. The apparatus comprises a base 30, and a hammer 31, the latter being pivotally suspended on the support member 32. Stop 33 is provided to hold the hammer and anvil in spaced apart relationship. Attached to the shank of the hammer or formed integrally therewith and located rearwardly of the support member 32 is the weight 34. This has sufficient weight to counterbalance the head of the hammer, so that the jaw of the cracker remains normally in an open position and returns automatically to such position after the hammer has been struck.

In operation, a plurality of crab legs are inserted into the jaw of the cracker, the small legs being positioned toward the front of the anvil and the larger legs being placed toward the rear. The hammer is then struck with the hand or actuated mechanically to cause it to strike the crab legs uniformly, thereby cracking them open without crushing the meat, which may be recovered in whole pieces. Upon releasing the pressure, the hammer automatically returns to its position of rest. This is a spaced distance from the anvil so as to make possible the facile introduction of another charge of crab legs during a subsequent operation but is sufficiently advanced toward the anvil as to require a minimum of effort on the part of the operator to strike the hammer. When it is desired to stroke only a portion of a crab member interposed between anvil and hammer, the latter may be struck on one side or the other, thereby causing it to pivot laterally and to strike preferentially the indicated portion. The apparatus thus provides a simple, flexible, easily operated device for rapidly producing entire pieces of crab meat with a minimum of effort and inconvenience.

Having now described my invention in preferred embodiments, I claim as new and desire to protect by Letters Patent:

1. Apparatus for cracking the shells of crustacea which comprises in combination an anvil, a hammer adapted to be advanced toward and retracted from said anvil, means for retracting said hammer from said anvil and for holding it normally apart therefrom, and stop means interposed transversely between the anvil and the hammer for preventing forcible contact therebetween, whereby to permit cracking said shells without crushing the meat enclosed thereby.

2. A crab cracker comprising a base having an anvil at one end thereof, a hammer adapted to be oscillated toward and away from said anvil and comprising a head and a shank, support means pivotally attached to said hammer intermediate its ends, and means comprising a weight attached to said shank portion rearwardly of said support means for holding said head normally apart from said anvil and for returning it to such position after oscillation theretoward.

3. A crab cracker comprising in combination a base having an anvil on the front end thereof, a standard extending upwardly from said base intermediate its ends, a hammer pivotally attached to said standard and disposed opposite said anvil to form a jaw which may be opened and closed by the oscillation of said hammer, at least one stop positioned forwardly on said base for preventing close contact of said hammer with said anvil, whereby to permit the cracking of the shells of crabs without crushing the meat enclosed thereby, stop means positioned rearwardly on said base and adapted to contact the shank of said hammer, whereby to fix the maximum opening of said jaw, and resilient means for opening said jaw after closure thereof and for holding it in a normally open position.

4. Apparatus for cracking the shells of crustacea which comprises in combination an anvil, a hammer disposed opposite said anvil, and means for pivotally mounting said hammer so that it may be oscillated both longitudinally and transversely with respect to said anvil.

5. A crab cracker comprising in combination an anvil, opposite said anvil an elongated hammer having a pair of inwardly tapering and interconnected recesses extending transversely therethrough whereby to form a pivot point within the body of said hammer, and means for supporting said hammer on said pivot point whereby to enable the oscillation both longitudinally and laterally of said hammer with respect to said anvil.

6. Apparatus for cracking the shells of crustacea which comprises an elongated base member, on the base member an anvil portion adapted to support a plurality of crustacean members, a standard extending outwardly from the base member intermediate its ends, a hammer pivotally mounted on the standard and adapted to oscillate toward and away from the anvil, resilient means for holding the hammer normally apart from the anvil and stop means interposed transversely between the anvil and the hammer for preventing forceable contact of a substantial portion of the hammer surface with the anvil, thereby permitting cracking the shells without crushing the meat.

7. Apparatus for cracking the shells of crustacea which comprises an elongated base member, on the base member an anvil portion adapted to support a plurality of crustacean members, a standard extending outwardly from the base member intermediate its ends, opposite the anvil an elongated hammer pivotally mounted on the standard and adapted to oscillate toward and away from the anvil, a rubber band interconnecting the hammer and the anvil for holding the hammer normally apart from the anvil, and stop means interposed transversely between the anvil and the hammer for preventing forceable contact of a substantial portion of the hammer surface with the anvil, thereby permitting cracking the shells without crushing the meat.

8. Apparatus for cracking the shells of crustacea which comprises in combination a base, an anvil on the base, an elongated, transversely apertured hammer disposed opposite the base, a wire support member attached to the base and extending through the transverse opening in the hammer, thereby pivotally mounting the latter with respect to the anvil, and means for holding the hammer normally apart from the anvil.

9. Apparatus for cracking crab legs which comprises an anvil adapted to support a plurality of crab legs arranged side by side in order of increasing diameter, a hammer disposed opposite the anvil, and means for mounting the hammer for oscillation toward and away from the anvil, the face of the hammer being disposed obliquely with respect to the anvil when adjacent thereto, thereby providing a wedge-shaped opening between hammer and anvil adapted to receive the prearranged crab legs, the smaller ones of the legs being stationed in the apex of the wedge-shaped opening, and enabling striking all of the legs with substantially equal force and cracking them simultaneously without crushing the legs of larger diameter.

10. Apparatus for cracking crab legs which comprises an anvil adapted to support a plurality of crab legs arranged side by side in order of increasing diameter, a hammer disposed opposite the anvil, stop means interposed transversely between the anvil and the hammer for preventing forceable contact of a substantial portion of the hammer with the anvil, and means for mounting the hammer for oscillation toward and away from the anvil, the face of the hammer being disposed obliquely with respect to the anvil when adjacent thereto, thereby providing a wedge-shaped opening between hammer and anvil adapted to receive the prearranged crab legs, the smaller ones of the legs being stationed in the apex of the wedge-shaped opening, and enabling striking all of the legs with substantially equal force and cracking them simultaneously without crushing the legs of larger diameter.

KENNETH LOGAN.

REFERENCES CITED

The following references are of record in the file of this patent:

UNITED STATES PATENTS

| Number | Name | Date |
|---|---|---|
| 558,673 | Colling | Apr. 21, 1896 |
| 1,826,848 | Vietor | Oct. 13, 1931 |

FOREIGN PATENTS

| Number | Country | Date |
|---|---|---|
| 610,111 | France | May 29, 1926 |
| 9,354 | Great Britain | 1911 |